United States Patent [19]
Enoki et al.

[11] Patent Number: 5,924,449
[45] Date of Patent: Jul. 20, 1999

[54] HOT AND COLD WATER MIXING DEVICE

[75] Inventors: Masatoshi Enoki; Toshihide Ushita; Hideyuki Matsui, all of Kitakyushu, Japan

[73] Assignee: Toto Ltd., Kitakyushu, Japan

[21] Appl. No.: 08/887,250

[22] Filed: Jul. 2, 1997

Related U.S. Application Data

[62] Continuation of application No. 08/661,713, Jun. 11, 1996, abandoned, which is a continuation of application No. 08/351,445, filed as application No. PCT/JP94/00652, Apr. 20, 1994, abandoned.

[30] Foreign Application Priority Data

Apr. 23, 1993 [JP] Japan ........................................ 5-97813

[51] Int. Cl.[6] .................................................. F16K 27/00
[52] U.S. Cl. ........................ 137/607; 137/454.5; 137/605
[58] Field of Search ................................. 137/454.5, 605, 137/607

[56] References Cited

U.S. PATENT DOCUMENTS 4,381,073  4/1983  Gloor .

FOREIGN PATENT DOCUMENTS

| A-2101438 | 8/1992 | Canada . |
| A-0242680 | 10/1987 | European Pat. Off. . |
| A-0390121 | 10/1990 | European Pat. Off. . |
| 55-119470 | 8/1980 | Japan . |
| 63-17903 | 1/1982 | Japan . |
| 64-3880 | 2/1989 | Japan . |
| 1-261576 | 10/1989 | Japan . |
| 1-165384 | 11/1989 | Japan . |
| 3-55971 | 5/1991 | Japan . |

*Primary Examiner*—John Fox
*Attorney, Agent, or Firm*—Finnegan, Henderson, Farabow, Garrett & Dunner, L.L.P.

[57] ABSTRACT

A hot and cold water mixing device which comprises one or more valve units each constituted by accommodating an operating member within a hollow casing, and a housing into which the one or more valve units are inserted and arranged and in which two primary water passages communicating with a hot water supply source and a cold water supply source, respectively, are formed. The housing is composed of an outer housing (1) and an inner housing (2) which is inserted into the outer housing and which is formed with water holes (11,12,13) communicating with said valve units, and at least two primary water passages (5,6) are formed between the outer housing and the inner housing by separating members (3). Further, since the hot water passage (5) and the cold water passage (6) are formed between the outer casing (1) and the inner housing (2) using separating members (13), the primary water passages can easily be formed and, simultaneously, the construction of the mixing device can be simplified and the assembling and disassembling operations can be facilitated.

13 Claims, 3 Drawing Sheets

HOT AND COLD WATER MIXING DEVICE

This is a continuation of application Ser. No. 08/661,713, filed Jun. 11, 1996, which is a continuation of Ser. No. 08/351,445, filed Dec. 21, 1994, both now abandoned and a national stage of PCT/JP94/00652 filed Apr. 20, 1994.

TECHNICAL FIELD

The present invention relates to a hot and cold water mixing device for mixing hot and cold water and discharging the mixed water and, more particularly, to a hot and cold water mixing device having a feature in the construction of water passages in the device.

BACKGROUND ART

The hot and cold water mixing device is formed therein with a hot water passage and a cold water passage, through which hot and cold water pass, respectively, a mixing chamber therein for mixing the introduced hot and cold water, and a mixed water passage through which the mixed water is delivered, in order to mix, in a suitable ratio, the hot and cold water supplied from a hot water supply source and a cold water supply source, respectively, and to deliver the mixed water at a desired temperature.

Further, in the predetermined positions of the water passages are built and arranged a mixing valve having an automatic temperature regulating function to automatically regulate the mixing ratio of the hot and cold water to a set temperature, an opening and closing valve for regulating the delivered amount of the mixed water, and a change-over valve for performing a changeover of the delivery for faucet and the delivery for shower.

Recently, each of these valves has been summarized in a unit as a function unit which is detachably fitted within the housing of the device in order to facilitate the assembly and maintenance of the valves.

The hot and cold water mixing device, in which a valve summarized in a unit is fitted as a valve unit within the housing of the device, is known from, for example, JPB-56 (1981)-2.4147. In this example, the valve unit (thermostat mixing valve) is detachably fitted within the housing of the device, which is composed of a casting material of metal such as copper alloy.

Composing the housing of the device of a casting material is preferable in that the pressure resistance of the primary water passages such as the hot water passage, cold water passage and the like within the housing is increased and the appearance of the device as a product is made more attractive. However, it has disadvantages in that cores for the water passages must be used in casting the device, which takes much time in the manufacturing process and makes the price of the product higher and, also, the device becomes heavier in weight.

For this reason, a hot and cold water mixing device is proposed in which the housing of the device is composed of a metal pipe material and the valve units are fitted therein (for example, U.S. Pat. No. 4,381,073). In this example, since the housing of the device is composed of a metal pipe material, the housing is easy to produce and can be reduced in weight.

However, it is necessary for the primary water passages (hot water passage, cold water passage) within the housing of the device to be constituted between the inner wall of the housing of the device and the outer wall of the casing of the valve unit. Therefore, the construction of the casing of the valve unit becomes complicated, i.e., the form and size of the casing of the valve unit must be changed in correspondence to the length, diameter and the like of the housing of the device and, simultaneously, a special seal construction must be provided to constitute two and more water passages.

For such reasons, there is a problem in that arranging the standardization of the valve unit is difficult and the valve unit per se becomes larger in size.

Besides this, a further hot and cold water mixing valve is known in which the housing of the device is constituted by an outer casing and an inner casing disposed inside the outer casing, and a hot water passage formed between the outer casing and the inner casing leading to a hot water supply source (JUB-63(1988)-17903).

In this example, however, there is a problem in that since the cold water passage leading to the cold water supply source is formed within the valve unit fitted in the inner casing, the construction of the valve unit becomes complicated and, simultaneously, the standardization thereof is difficult. Moreover, since the hot water passage and the cold water passage are provided in the position where they overlap with each other, the diameter of the housing of the device becomes large.

The present invention has been made taking such points into consideration and aims at providing a hot and cold water mixing device, which allows the housing thereof to be reduced in weight and the valve unit to be standardized, and which is easily assembled.

DISCLOSURE OF INVENTION

In order to achieve the above-mentioned object, the present invention provides a hot and cold water mixing device which comprises one or more valve units each constituted by accommodating an operating member within a hollow casing, and a housing into which one or more valve units are inserted and arranged and in which two primary water passages communicating with a hot water supply source and a cold water supply source, respectively, are formed, characterized in that said housing is composed of an outer housing and an inner housing which is inserted in said outer housing and which is formed with water holes communicating with said valve units, and at least two said primary water passages are formed between said outer housing and said inner housing by separating members.

According to the invention, since the inner housing in which the valve unit is fitted, is formed independently in a separate manner from the outer housing, the same valve unit can be used even when the form and size of the outer housing are changed and, therefore, the standardization of the valve unit can be arranged.

Further, since the hot water passage and the cold water passage are formed using the separating member between the outer housing and the inner housing, forming the primary water passages is easy and, at the same time, the construction of the mixing device can be simplified and the assembling and disassembling operations thereof can be facilitated.

BEST MODE FOR CARRYING OUT THE INVENTION

The embodiments of the present invention will be explained with reference to the drawings.

Figure 1:
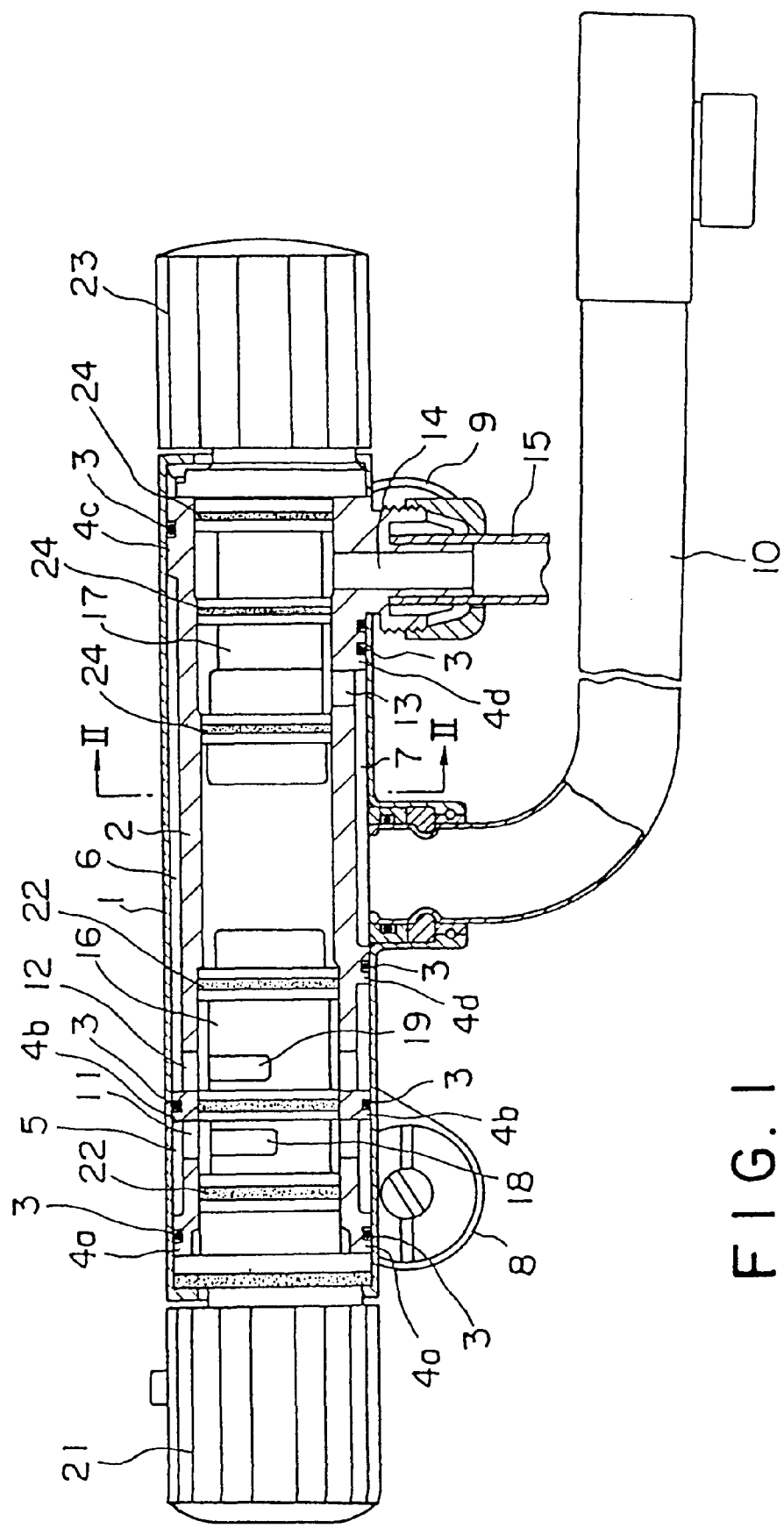
FIG. 1 is a cross-sectional view showing an embodiment of the present invention.

FIG. 1 is a cross-sectional view showing an embodiment of the present invention, and the reference character 1 in the drawings indicates an outer housing of a device. The outer housing 1 is formed by a hollow cylindrical pipe material, for example, a pipe made of metal. Within the outer housing 1 is disposed a hollow cylindrical inner housing 2 which opens at both ends thereof. This inner housing 2 is made of, for example, a heat resistant synthetic resin.

On the outer wall surface of the inner housing 2 are mounted separating members for constituting water passages, for example, resilient seal members 3. These seal members 3 are mounted and held on a plurality of seal holding portions 4a to 4d formed on the outer wall surface of the inner housing 2 so as to protrude therefrom. The arrangement and form of these seal holding portions 4a to 4d are suitably designed according to the position, size, number and the like of the primary and secondary water passages formed between the outer housing 1 and the inner housing 2.

In the present embodiment, as shown in FIG. 1, the first seal holding portion 4a formed at the left end of the inner housing 2 and the second seal holding portion 4b formed next to the first seal holding portion 4a at the right side thereof define a hot water passage 5 between the outer housing 1 and the inner housing 2. Also, the third seal holding portion 4c formed at the right end of the inner housing 2 and the second seal holding portion 4b define a cold water passage 6 in the upper half portion between the outer housing 1 and the inner housing 2.

Figure 2:
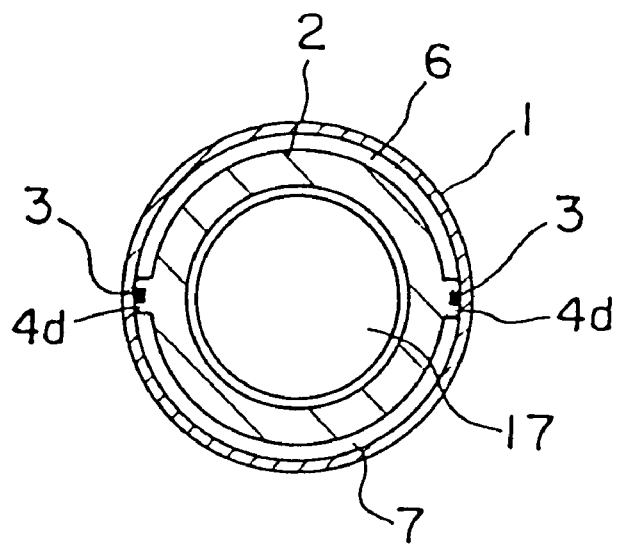
FIG. 2 is a sectional view taken along line II—II of FIG. 1.

Further, on the outer wall surface of the inner housing 2, in a position at the right side of the second seal holding portion 4b, is formed the fourth seal holding portion 4d which encloses continuously the lower half of the inner housing 2. The fourth seal holding portion 4d is continuously formed on the outer wall surface of the inner housing 2 by a distance of approximately half the circumference in the circumferential direction from the lower side of the inner housing 2 and, simultaneously, is further formed substantially in the axial direction in a straight line (refer to FIG. 2) extending to the right in FIG. 1 and, in a position at the left side of the third seal holding portion 4c, is again continuously formed in the circumferential direction toward the lower side by a distance of approximately half the circumference. Thus, the fourth seal holding portion 4d defines a passage 7 for the mixed hot and cold water between the outer housing 1 and the inner housing 2.

The hot water passage 5 is connected to a hot water connecting pipe 8 connected to a hot water supply source (not shown), and the cold water passage 6 is connected to a cold water connecting pipe 9 connected to a cold water supply source (not shown). Further, the mixed hot and cold water passage 7 is connected to a delivery pipe 10 connected to the lower end portion substantially at the middle of the outer casing 1.

Moreover, correspond to the hot water passage 5, cold water passage 6 and mixed water passage 7, the inner housing 2 is formed with through water holes 11, 12 and 13, through which the hot water, cold water and mixed water pass, respectively.

In the present embodiment, the inner housing 2 is formed at the right end portion thereof with a second mixed water passage 14, which is connected to a shower pipe 15 connected to a shower (not shown).

Valve units having respective functions are detachably inserted in the inner housing 2. Inserted in the inner housing 2 from the left side thereof is an automatic temperature regulating valve unit 16 having the function of performing the automatic regulation of temperature, and further inserted therein from the right side thereof is an opening and closing change-over valve 17 which serves to adjust the delivery flow rate and to change the delivery direction from the delivery pipe 10 to the shower pipe 15 and vice versa.

The automatic temperature regulating valve unit 16 has openings 18 and 19 communicating with the hot water passage 5 and cold water passage 6, respectively, and is provided with a hot and cold water mixing chamber (not shown) therein. To the automatic temperature regulating valve unit 16 is fitted a temperature regulating handle 21 which allows a desired temperature to be selected and regulated from the outside, and once a predetermined temperature has been set, a mixing ratio of the hot and cold water is adapted to be automatically adjusted by a feeler (not shown) arranged in the interior. Also, on the outer circumferential portion of the automatic temperature regulating valve unit 16 are mounted at least three seal members 22 at predetermined intervals in the axial direction to separate the openings 18 and 19 from the other water passages.

In the opening and closing change-over valve unit 17 are provided an opening and closing valve for adjusting the delivery amount of the mixed water and a change-over valve (not shown) for changing the delivery direction, an operating handle 23 for operating these valves is fitted to the right end of the mixing device. Also, on the outer circumferential portion of the opening and closing change-over valve unit 17 are mounted at least three seal members 24 at predetermined intervals in the axial direction to separate the mixed water hole 13 and second mixed water passage 14 from the other water passages.

According to the present embodiment constituted as described above, the hot water from the hot water supply source is supplied to the hot water passage 5, and flows into the automatic temperature regulating valve unit 16 through the hot water hole 11 and the opening 18. Also, the cold water from the cold water supply source is supplied to the cold water passage 6 and flows into the automatic temperature regulating valve unit 16 through the cold water hole 12 and the opening 19. The hot and cold water, which have flowed into the automatic temperature regulating valve unit 16, are mixed in a ratio corresponding to a set temperature, and the mixed hot and cold water flows through the interior of the inner housing 2 to the opening and closing change-over valve unit 17. By operating the opening and closing change-over valve unit 17, this mixed water is delivered from the delivery pipe 10, or the shower (not shown), passing through the mixed hot and cold water passage 7 or the second mixed hot and cold water passage 14.

With the present embodiment, since the housing of the device is composed of a combination of the outer housing 1 and inner housing 2 which are formed independently from each other, it is simple in construction and easy to manufacture and, in addition, can largely be reduced in weight, as compared with the housing composed of casting material. Particularly, making the inner housing 2 of synthetic resin allows a reduction in weight and the facilitation of manufacturing to be improved.

Further, a suitable change in the position and form of the seal holding portions 4a to 4d, protruding from the outer wall of the inner housing 2, enables desired water passages to be simply and easily formed between the outer housing 1 and the inner housing 2. This allows the water passages to be formed easily corresponding to the various design conditions of the outer housing 1.

Moreover, since at least two primary water passages, that is, the hot water passage 5 and the cold water passage 6 are formed between the outer housing 1 and the inner housing 2, the form of the casings of the different valve units 16 and 17 inserted within the inner housing 2 can be designed independently from the primary water passages, thereby allowing the standardization of the used valve units to be arranged. Also, since the form of the outer housing 1 and inner housing 2 can be simplified, the outer housing 1 can be manufactured using a metal pipe and the inner housing 2 can be produced by injection moulding using a metal mould of simple construction, thereby allowing the manufacturing cost to be largely reduced as compared with that of the inner and outer housings of conventional construction.

Further, since the hot and cold water mixing device can be assembled only by inserting the inner housing 2 into the outer housing 1 and, subsequently, inserting the respective valve units into the inner housing 2 from both ends thereof and fixing them thereto, the assembly process is simple and dismantling, maintenance, inspection and the like can be easily performed.

Figure 3:
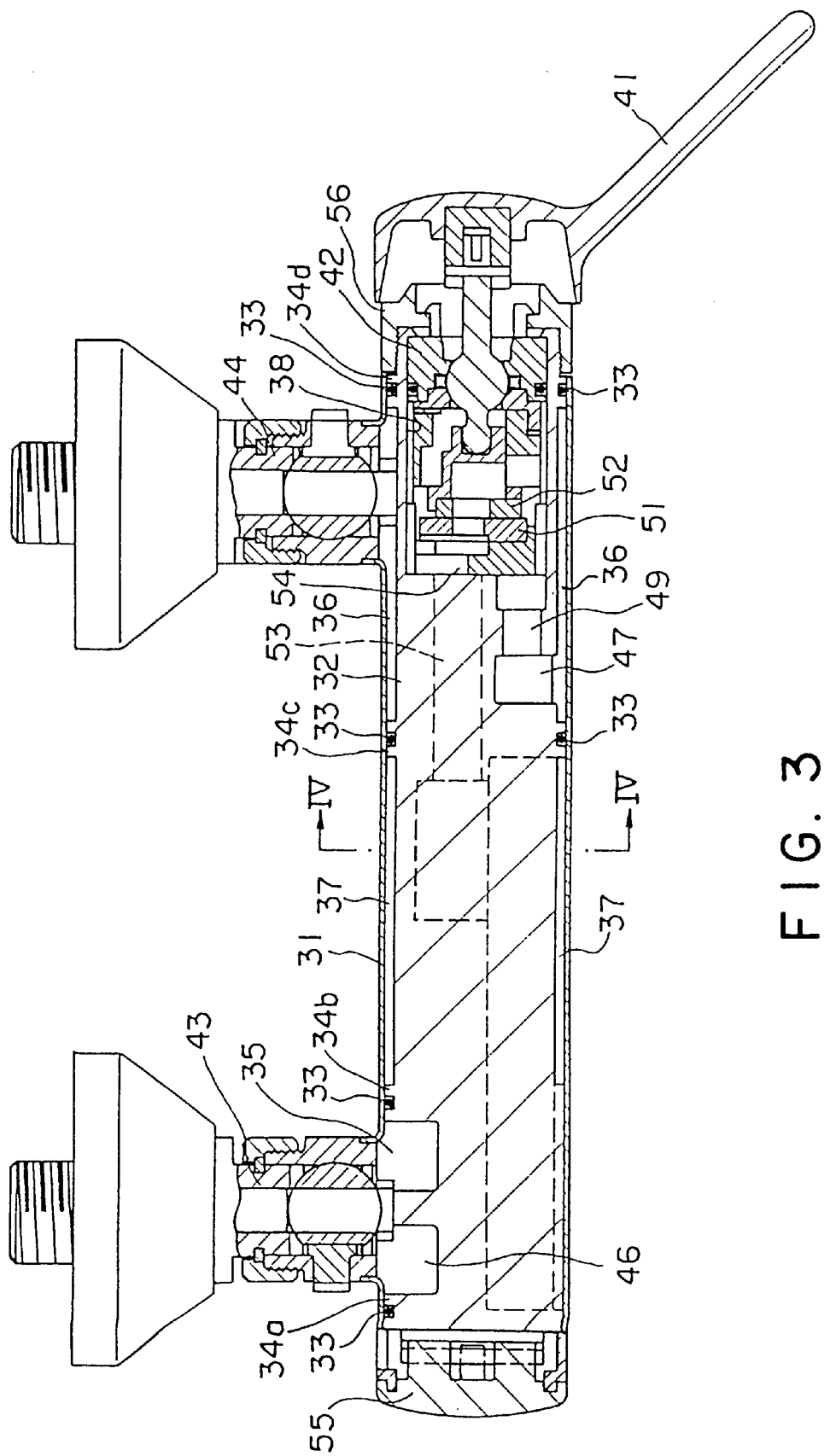
FIG. 3 is a cross-sectional view showing another embodiment of the present invention.

FIG. 3 is a cross-sectional view showing a second embodiment of the present invention. This embodiment shows a hot and cold water mixing valve having a single lever type valve unit 42 which allows the opening and closing operations and an adjustment in the temperature of the mixed water to be performed using a single lever 41.

Referring to FIG. 3, reference character 31 indicates an outer housing, which is formed by a metal pipe. An inner housing 32 made of synthetic resin is disposed within the outer housing 31.

On the outer wall surface of the inner housing 32 are formed a plurality of projecting seal holding portions 34a to 34d on which seal members 33 as separating members for constituting the water passages are mounted and held. At the left end of the inner housing 32 is formed a first seal holding portion 34a, and adjacent at the right side thereof is further formed a second seal holding portion 34b. These first and second seal holding portions 34a and 34b define a hot water passage 35 between the outer housing 31 and the inner housing 32.

Moreover, a third seal holding portion 34c formed at a distance to the right side of the second seal holding portion 34b and a fourth seal holding portion 34d formed at the right end of the inner housing 32 also define a cold water passage 36 between the outer housing 31 and the inner housing 32.

Further, the second seal holding portion 34b and the third seal holding portion 34c define a mixed water passage 37 between the outer housing 31 and the inner housing 32.

At the right end portion of the inner housing 32 is formed a space 38 of a circular cross-section, in which a valve unit 42 is accommodated and disposed.

Figure 4:
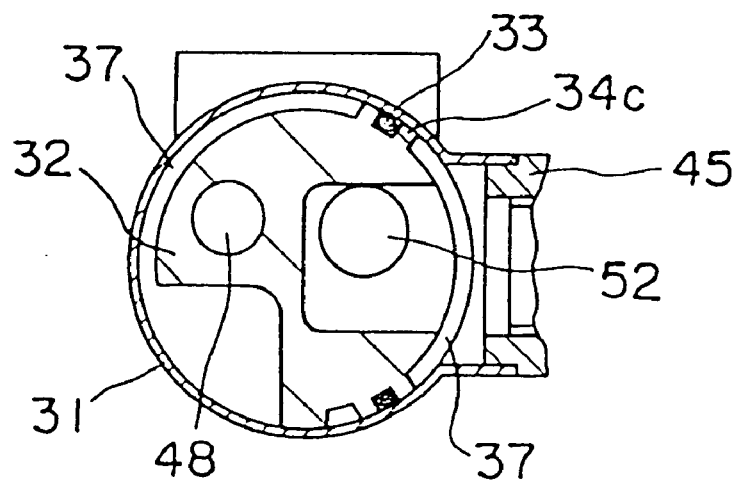
FIG. 4 is a sectional view taken along line IV—IV of FIG. 3.

The hot water passage 35 is connected to a hot water supply source (not shown) by way of a hot water connecting pipe 43, and the cold water passage 36 is connected to a cold water supply source (not shown) by way of a cold water connecting pipe 44. Further, the mixed water passage 37 is connected to a delivery pipe 45 (refer to FIG. 4) connected to the lower end substantially at the middle of the outer housing 31.

The inner housing 32 is provided with water holes 46 and 47, through which hot water and cold water pass, in corresponding relation to the hot water passage 35 and the cold water passage 36, and these water holes 46 and 47 are connected to the respective inflow ports of the valve units 42 by way of a hot water channel 48 (refer to FIG. 4) and a cold water channel 49 formed within the inner housing 32.

A stationary valve seat 51 and a movable valve 52 disposed on the stationary valve seat 51 for an sliding engagement therewith are provided within the valve unit 42, and hot and cold water are mixed by shifting the movable valve 52 and adjusting the position thereof by means of the single lever 41 so that the mixed water having a desired temperature can be delivered with a desired flow rate.

Within the inner housing 32 is further formed a mixed water channel 53 communicating with a delivery port 54 provided at the end of the valve unit 42, and the mixed water channel 53 is connected, in turn, to the mixed water passage 37.

Reference characters 55 and 56 indicate caps mounted on each one of the two ends of the outer housing 31, and the mounting and dismounting these caps 55 and 56 allow the assembly and disassembly of the outer and inner housings 31 and 32 to be simply carried out.

According to the present embodiment, the hot and cold water, which have flowed into the hot and cold water passages 35 and 36, pass through the interior of the inner housing 32 and feed into the single lever type valve unit 42. The hot and cold water are mixed within the valve unit 42 by the widely known function of the single lever type valve unit 42, and the mixed water is delivered from the delivery pipe 45.

With the present embodiment, since the outer housing 31 is formed by a metal pipe and the inner housing 32 is made of a synthetic resin material, the housing is lighter in weight as compared with the conventional housing made of casting material. Therefore, the manufacturing cost can largely be reduced. Also, a suitable change in the position and form of the seal holding portions 34a to 34d of the inner housing 32 allows required water passages to be simply and easily formed.

Further, since the space 38, in which the valve unit 42 is accommodated and disposed, can be formed in a determined form and size regardless of the form of the outer housing 31, the standardization of the valve unit 42 becomes easier.

Although this embodiment shows the example of the seal members being mounted on the outer wall surface of the inner housing, they may be fitted to the inner wall surface of the outer housing. Also, the example in which three water passages comprising the hot water passage, cold water passage and mixed water passage are provided between the outer housing and the inner housing is shown. However, more water passages can be constituted in an arbitrary form and in an arbitrary position by suitably selecting and arranging the seal members for separation.

Moreover, the present embodiment shows the example of a metal pipe member being used as the outer housing. However, in addition to the outer housing made of a pipe material, for example, a pipe member made of forging, a pipe member made of casting and the like can be used. Further, the pipe member can be formed by combining a plurality of divided segment materials.

In addition, the example of the outer housing being cylindrical in shape is shown. However, it is not limited to such a cylindrical shape, but may be of an arbitrary shape, for example, a cross-section of an oval, a cross-section of a polygon and the like. Also in this case, since the inner housing is formed independently in a separate manner and the valve units are inserted therein, standardized units can be used without designing the valve units particularly.

Industrial Applicability

As described above, the present invention enables the hot and cold water mixing device to be simplified in construction and largely reduced in weight. Further, the water passages within the housing can be arbitrarily constituted, so that the mixing device can easily correspond to the various conditions imposed thereto. In addition, the standardization of the valve units can be arranged, and the assembly and disassembly are easy. Particularly, forming the outer housing by a metal pipe and moulding the inner housing of synthetic resin material allows the manufacturing cost of the housing of the mixing device to be largely reduced.

We claim:

1. A fluid mixing device comprising:
   at least one valve unit having a valve casing;
   an inner housing having holes;
   an outer housing, said inner housing being inserted into said outer housing and defining a gap therebetween; and
   separating members arranged in said gap and forming at least two fluid passages between said outer and inner housings, said passages communicating with a first fluid supply source and a second fluid supply source, respectively, said at least one valve unit being detachably inserted into said inner housing to provide selective metering of fluid flow through said holes, and said inner housing providing a capability for accommodating a standardized valve unit independent of the form and size of said outer housing.

2. A hot and cold water mixing device as claimed in claim 1, wherein said separating members are mounted on the outer wall surface of the inner housing.

3. A hot and cold water mixing device as claimed in claim 1, wherein said separating members each are composed of a seal member having elasticity.

4. A hot and cold water mixing device as claimed in claim 1, wherein said outer housing and said inner housing are formed by raw materials which are different from each other.

5. A hot and cold water mixing device as claimed in claim 1, wherein said inner housing is made of resin material.

6. A hot and cold water mixing device as claimed in claim 1, wherein said outer housing is formed by a pipe member made of metal.

7. A fluid mixing device as claimed in claim 1, wherein a third fluid passage, through which a mixture of said first and second fluids passes, is further formed between the outer housing and the inner housing.

8. A housing assembly for a fluid mixing device comprising:
   an outer housing in fluid connection with a first supply source and a second supply source;
   an inner housing formed independently of, and inserted into, said outer housing, said inner housing having a first hole and a second hole, said inner and outer housings defining a first and a second passage therebetween, said first and second passages in fluid communication with said first and second holes, respectively, and in fluid communication with said first and second supply sources, respectively; and
   said inner housing for accommodating the detachable insertion of a valve unit having a valve casing, the valve unit for selectively metering the flow of fluid through said first and second holes, said inner housing providing a capability for accommodating a standardized valve unit independent of the form and size of said outer housing.

9. The housing assembly of claim 8, wherein said inner housing has a third hole, said inner housing and said outer housing define a third passage therebetween, said third passage in fluid communication with said third hole and with a first outlet.

10. The housing assembly of claim 9, wherein said inner housing is capable of accommodating the detachable insertion of a second valve unit to adjust the flow through said third passageway.

11. The housing assembly of claim 9, wherein said third passage is in fluid communication with said first outlet and a second outlet and said inner housing is capable of accommodating the detachable insertion of a second valve unit to direct the flow, in a first configuration, to said first outlet and, in a second configuration, to said second outlet.

12. The housing assembly of claim 9, wherein said inner housing and said outer housing define a fourth passage there between, said fourth passage in fluid communication with a second outlet, and said inner housing is capable of accommodating the detachable insertion of a second valve unit to direct the flow, in a first configuration, to said third passage and, in a second configuration, to said fourth passage.

13. The housing assembly of claim 8, wherein said inner housing is monolithic.

* * * * *

UNITED STATES PATENT AND TRADEMARK OFFICE
CERTIFICATE OF CORRECTION

PATENT NO. : 5,924,449
DATED : July 20, 1999
INVENTOR(S) : Masatoshi ENOKI et al.

It is certified that error appears in the above-identified patent and that said Letters Patent is hereby corrected as shown below:

In Claim 2, col. 7, line 40, "hot and cold water" should read --fluid--.

In Claim 3, col. 7, line 43, "hot and cold water" should read --fluid--.

In Claim 4, col. 7, line 46, "hot and cold water" should read --fluid--.

In Claim 5, col. 7, line 49, "hot and cold water" should read --fluid--.

In Claim 6, col. 8, line 1, "hot and cold water" should read --fluid--.

Signed and Sealed this

Eighteenth Day of April, 2000

*Attest:*

Q. TODD DICKINSON

*Attesting Officer*     *Director of Patents and Trademarks*